Feb. 8, 1927. 1,617,283
G. ADKINS
TRAILER HITCH
Filed July 10, 1926  2 Sheets-Sheet 1
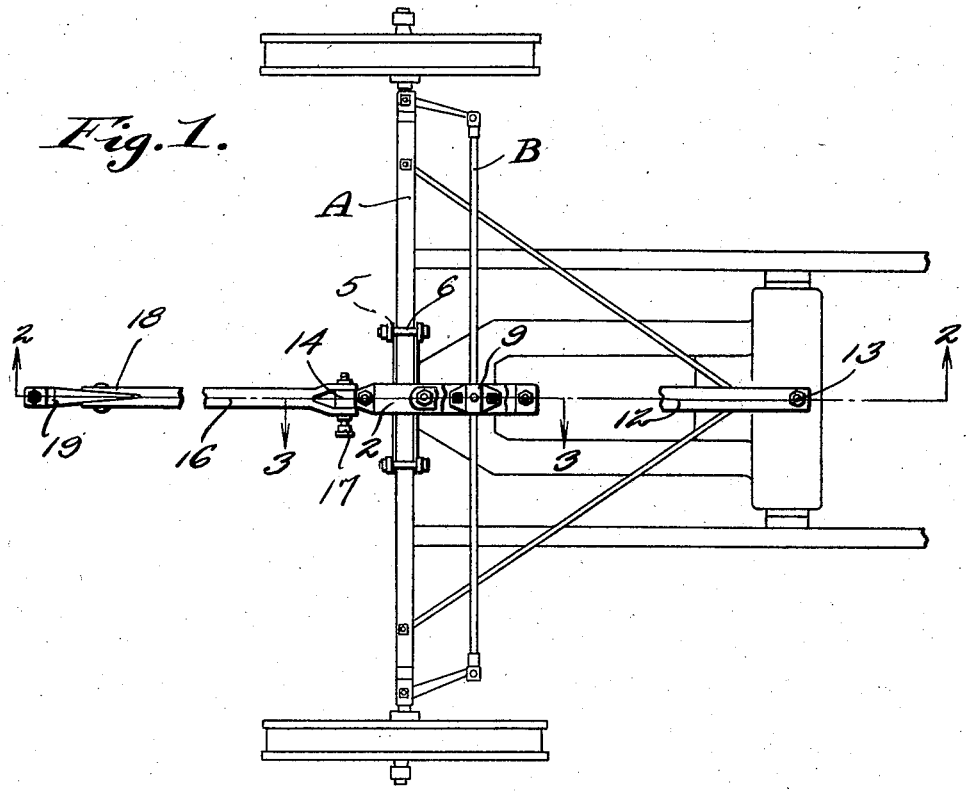
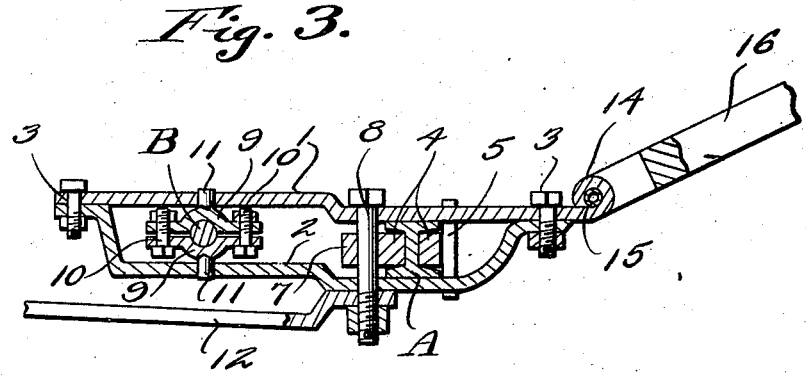
George Adkins
INVENTOR
BY Victor J. Evans
ATTORNEY
WITNESS:

Feb. 8, 1927.
G. ADKINS
1,617,283
TRAILER HITCH
Filed July 10, 1926  2 Sheets-Sheet 2
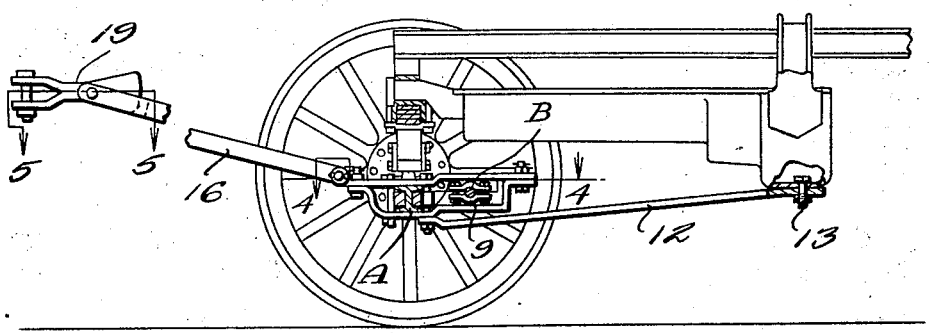
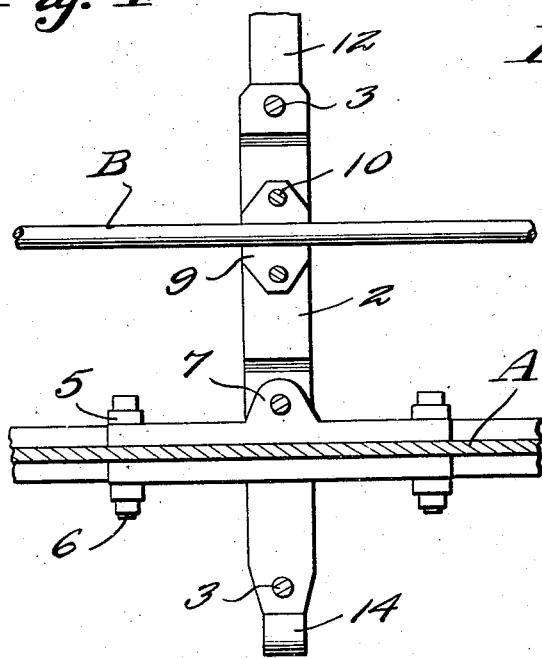
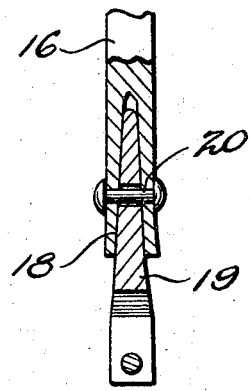

Patented Feb. 8, 1927.

1,617,283

UNITED STATES PATENT OFFICE.

GEORGE ADKINS, OF CARNEGIE, OKLAHOMA.

TRAILER HITCH.

Application filed July 10, 1926. Serial No. 121,710.

This invention relates to a hitch for trailers and other vehicles, the general object of the invention being to so form the hitch that the vehicle will be positively and accurately guided by the pulling power device.

Another object of the invention is to so make the hitch that it can be easily and quickly installed on the vehicle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a bottom plan view of part of a vehicle, showing the invention applied thereto.

Figure 2 is a section on line 2—2 of Figure 1.

Figure 3 is an enlarged section on line 3—3 of Figure 1.

Figure 4 is a section on line 4—4 of Figure 2.

Figure 5 is a section on line 5—5 of Figure 2.

In these views, 1 indicates an upper plate and 2 indicates a lower plate which has its ends fastened to the upper plate by the bolts 3, the major portion of the lower plate being offset so that a space is formed between the two plates through which pass the front axle A and the connecting rod B of the steering mechanism of the towed vehicle. A pair of bars 4 are clamped one on each side of the front axle by means of the upright pieces 5 fastened to the ends of the bars and the bolts 6 which connect the ends of the pieces together. The central portion of the rear bar is formed with a perforated ear 7 and the king bolt 8 passes through the plates 1 and 2 and the perforation in said ear to pivotally connect the plates 1 and 2 with the front axle through means of the clamping bars.

A pair of plates 9, each of which is provided with a semi-circular recess, is clamped to the connecting bar B by means of the bolts 10 and each of these plates is provided with a vertically arranged pintle 11, these pintles engaging holes formed in the plates 1 and 2. Thus the plates 1 and 2 are movably connected with the connecting bar through means of the clamping plates 9. A spring bar 12 has its ends perforated, with the perforation in one end engaging the king bolt 8 and the perforation in the other end engaging a bolt 13 which is carried by the fly wheel housing of the vehicle. This bar acts as a brace for the hitch.

The front end of the upper plate 1 is rounded to form an eye 14 to receive the bolt 15 which pivotally connects the forked rear end of the tongue 16 to the plate. I prefer to make this bolt 15 of hollow construction and to place a grease cup 17 thereon. The free end of the tongue is provided with a V-shaped notch 18 which receives the wedge-shaped part of the clevis 19 so that the clevis can move about a horizontal axis at the free end of the tongue. A rivet or bolt 20 connects the clevis to the tongue.

From the foregoing, it will be seen that the body of the hitch is firmly but pivotally connected with the vehicle to be towed and it is so connected with the connecting bar that the bar will be caused to move with the rocking movement of the hitch. The clamp which connects the hitch to the bar can rotate about a vertical axis in the body of the hitch. The hitch is also braced by the brace bar 12 and the tongue is movable about a horizontal axis and has its clevis also movable about a horizontal axis. Thus the device can be easily attached to a vehicle as it can be quickly adjusted to the point where it can be attached to said vehicle.

The device is very simple and durable, it is positive and accurate in guiding the pulled vehicle and it can be used for pulling trailers or pulling in vehicles that are out of order. By a slight change, it can be used with horses.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A hitch of the class described comprising upper and lower plates fastened together with a space between them to receive the axle and steering bar of a vehicle, bars clamped to the axle, a king bolt connecting one of the bars to the plates, clamping means rotatably supported by the plates and engaging the steering bar, a brace bar having one end connected with the king bolt and its other end with a part of the crank case of the vehicle and a tongue pivoted to the front end of one of the plates.

2. A hitch of the class described comprising a member of hollow construction and through which passes the front axle and steering bar of a vehicle, a pair of clamping bars clamping the axle, a king bolt pivoting the member to the center of the rear bar, a clamp engaging the steering bar and movable about a vertical axis in the member, a brace having one end engaging the king bolt and its other end a part of the vehicle and a tongue pivotally connected with the front end of the member.

3. A hitch of the class described comprising a member pivotally connected with the front axle of a vehicle, a clamp engaging the steering bar of the vehicle, said clamp being movable about a vertical axis in the member, a tongue pivoted to the member and having a V-shaped notch in its free end and a clevis having a wedge-shaped portion pivoted in the notch.

In testimony whereof I affix my signature.

GEORGE ADKINS.